United States Patent
Horiguchi

(10) Patent No.: US 9,025,506 B2
(45) Date of Patent: May 5, 2015

(54) WIRELESS COMMUNICATION DEVICE, WIRELESS COMMUNICATION SYSTEM AND WIRELESS COMMUNICATION METHOD

(71) Applicant: Kabushiki Kaisha Toshiba, Minato-ku, Tokyo (JP)

(72) Inventor: Tomoya Horiguchi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 117 days.

(21) Appl. No.: 13/776,477

(22) Filed: Feb. 25, 2013

(65) Prior Publication Data

US 2014/0064168 A1 Mar. 6, 2014

(30) Foreign Application Priority Data

Aug. 30, 2012 (JP) ................. 2012-189986

(51) Int. Cl.
*H04W 52/02* (2009.01)

(52) U.S. Cl.
CPC ............ *H04W 52/0229* (2013.01); *Y02B 60/50* (2013.01)

(58) Field of Classification Search
CPC .................... H04W 52/0229; H04W 52/0225; H04W 52/0209; H04W 52/0251; Y02B 60/50
USPC ........................................................ 370/311
See application file for complete search history.

(56) References Cited

U.S. PATENT DOCUMENTS

| | | | |
|---|---|---|---|
| 5,845,204 A * | 12/1998 | Chapman et al. | 455/343.1 |
| 8,169,943 B2 * | 5/2012 | Pelletier et al. | 370/311 |
| 8,468,377 B2 * | 6/2013 | Scott et al. | 713/323 |
| 8,711,745 B2 * | 4/2014 | Cai | 370/311 |
| 2006/0111062 A1 * | 5/2006 | Cunningham et al. | 455/152.1 |
| 2009/0161587 A1 | 6/2009 | Ishii et al. | |
| 2010/0048129 A1 | 2/2010 | Nishiyama | |
| 2011/0053540 A1 | 3/2011 | Sekimukai et al. | |
| 2012/0182916 A1 * | 7/2012 | Pelletier et al. | 370/311 |
| 2012/0258666 A1 * | 10/2012 | Kasami et al. | 455/41.2 |
| 2013/0090705 A1 * | 4/2013 | Bange et al. | 607/60 |

FOREIGN PATENT DOCUMENTS

| | | |
|---|---|---|
| JP | 4-029418 A | 1/1992 |
| JP | 2005-223793 A | 8/2005 |
| JP | 2010050843 A | 3/2010 |
| JP | 2011-055325 A | 3/2011 |
| WO | 2007049698 A1 | 5/2007 |

OTHER PUBLICATIONS

Japanese Office Action dated Feb. 6, 2015, issued in counterpart Japanese Application No. 2012-189986.

* cited by examiner

*Primary Examiner* — Min Jung
(74) *Attorney, Agent, or Firm* — Holtz, Holtz, Goodman & Chick PC

(57) ABSTRACT

According to an embodiment, a wireless communication device configured to perform an intermittent receiving operation during standby includes a frame detection monitoring unit and a timer unit. The frame detection monitoring unit is configured to monitor detection of a frame during a receiving operation in the intermittent receiving operation. The timer unit is configured to extend a period of the receiving operation when receiving a notice of detection of the frame from the frame detection monitoring unit, and to extend the period of the receiving operation again when receiving again the notice of detection of the frame from the frame detection monitoring unit during an extended period of the receiving operation.

14 Claims, 10 Drawing Sheets

WIRELESS COMMUNICATION DEVICE, WIRELESS COMMUNICATION SYSTEM AND WIRELESS COMMUNICATION METHOD

CROSS REFERENCE TO RELATED APPLICATION

This application is based upon and claims the benefit of priority from the prior Japanese Patent Application No. 2012-189986 filed on Aug. 30, 2012 in Japan, the entire contents of which are incorporated herein by reference.

FIELD

Embodiments described herein relate generally to a wireless communication device, a wireless communication system and a wireless communication method.

BACKGROUND

In a standby operation of a wireless communication device, the wireless communication device generally waits for a signal from the other terminal while performing an intermittent receiving operation to realize low power consumption. The intermittent receiving operation is realized by repeating an awake period for operating a circuit for detecting a signal from the other terminal and a sleep period for stopping the circuit.

To further reduce power consumption during the standby operation, it is necessary to make the awake period shorter and make the sleep period longer. However, when the awake period is made too short or the sleep period is made too long, usability of users decreases because a period of time required for establishing a connection is extended.

DETAILED DESCRIPTION

According to an embodiment, a wireless communication device configured to perform an intermittent receiving operation during standby includes a frame detection monitoring unit and a timer unit. The frame detection monitoring unit is configured to monitor detection of a frame during a receiving operation in the intermittent receiving operation. The timer unit is configured to extend a period of the receiving operation when receiving a notice of detection of the frame from the frame detection monitoring unit, and to extend the period of the receiving operation again when receiving again the notice of detection of the frame from the frame detection monitoring unit during an extended period of the receiving operation.

Hereinafter, an embodiment of the present invention will be described with reference to some drawings. The embodiment by no means limits the present invention.

Figure 1:
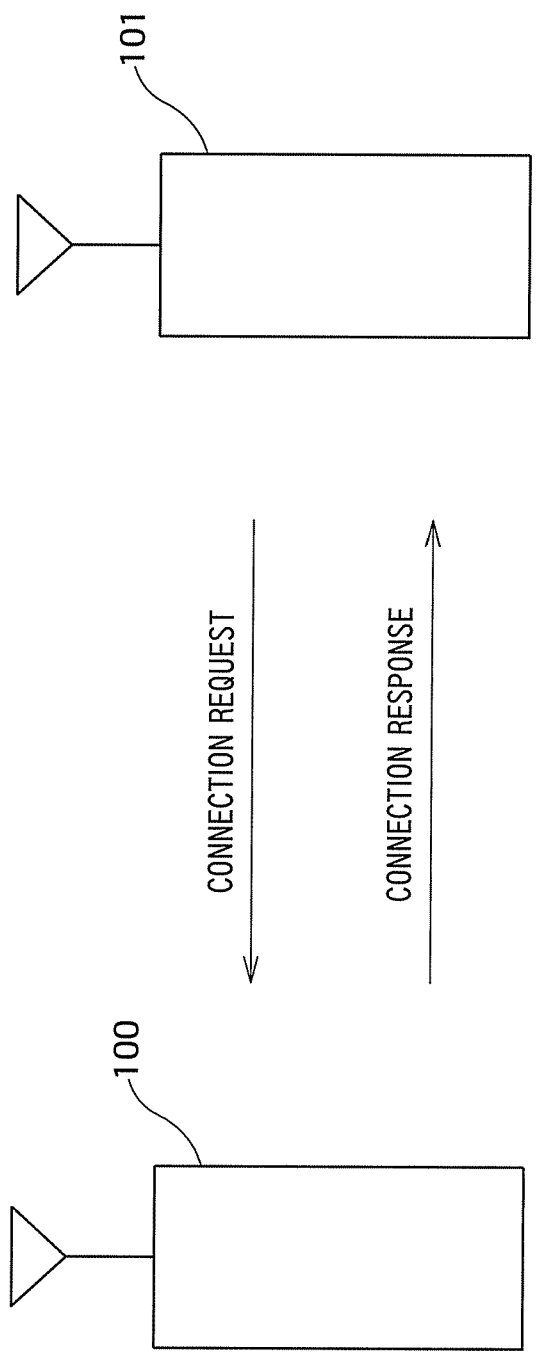
FIG. 1 is a view illustrating a configuration of a wireless communication system using a wireless communication terminal according to the present embodiment.

FIG. 1 is a view illustrating a configuration of a wireless communication system using a wireless communication terminal 100 according to the present embodiment. As illustrated in FIG. 1, the wireless communication system has a wireless communication terminal (first wireless communication device) 100 and a wireless communication terminal (second wireless communication device) 101. Each of the wireless communication terminals 100 and 101 will be referred to as terminal.

The terminal 100 waits for a connection request frame from the terminal 101 during standby (that is, in a case of a state before connection), and returns a connection response frame to the terminal 101 and establishes connection when receiving the connection request frame.

The terminal 101 continues intermittently transmitting connection request frames until the terminal 101 receives the connection response frames from the other terminal (terminal 100 in this case). Further, when receiving the connection response frame from the terminal 100, the terminal 101 stops transmitting the connection request frame and transitions to a connected state where the terminal 101 can communicate with the terminal 100 by radio.

Figure 2:
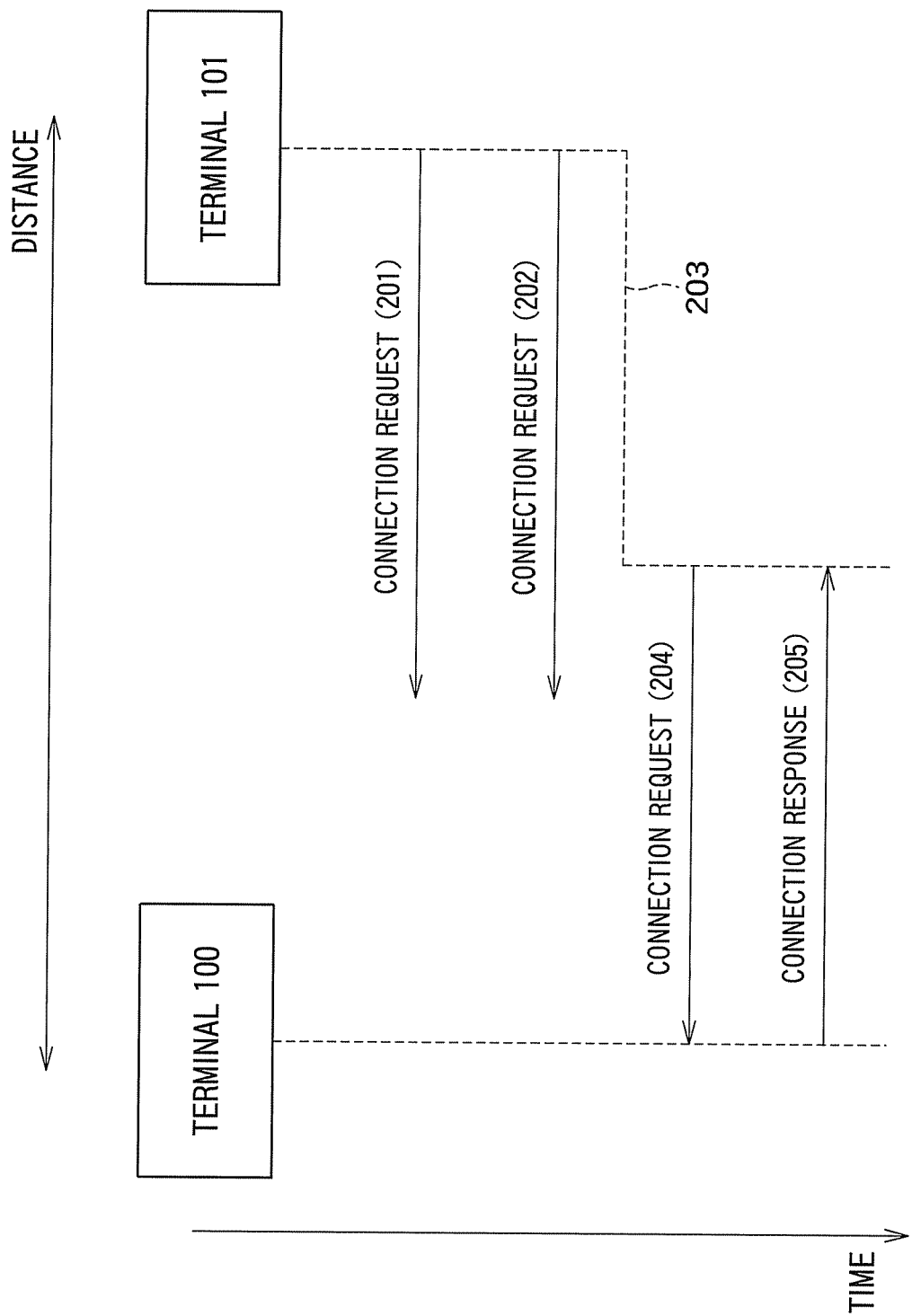
FIG. 2 is a view illustrating a sequence of establishing communication in a wireless communication system according to the present embodiment.

FIG. 2 is a view illustrating a sequence of establishing communication in a wireless communication system according to the present embodiment. Hereinafter, close proximity wireless communication is assumed as an example where the terminal 100 according to the present embodiment can provide a greater effect. That is, by placing the two terminals 100 and 101, which perform communication, closer to each other, the terminals 100 and 101 can receive transmission frames from each other and establish communication. Meanwhile, communication other than the close proximity wireless communication may be adopted.

In the present embodiment, close proximity wireless communication refers to wireless communication performed in a state where the terminal 100 and the terminal 101 are at a close distance of, for example, several centimeters from each other or in a contacted state. A wireless communication system (communication standard) for the close proximity wireless communication is, for example, TransferJet (registered trademark).

The vertical axis in FIG. 2 indicates the time, and the horizontal axis indicates the distance. With an example in FIG. 2, the terminal 101 starts transmitting a connection request frame 201 in a state where the connection request frame does not reach the terminal 100, that is, a state of out-of-service. At a point of time when a next connection request frame 202 is transmitted, the connection request frame 202 has not yet reached the terminal 100. However, by performing an operation 203 of placing the terminal 101 close to the terminal 100 (or, on the contrary, placing the terminal 100 close to the terminal 101), the terminal 100 can receive a next connection request frame 204 transmitted by the terminal 101. In response to reception of the connection request frame 204, the terminal 100 can transmit a connection response frame 205 to the terminal 101.

Figure 3:
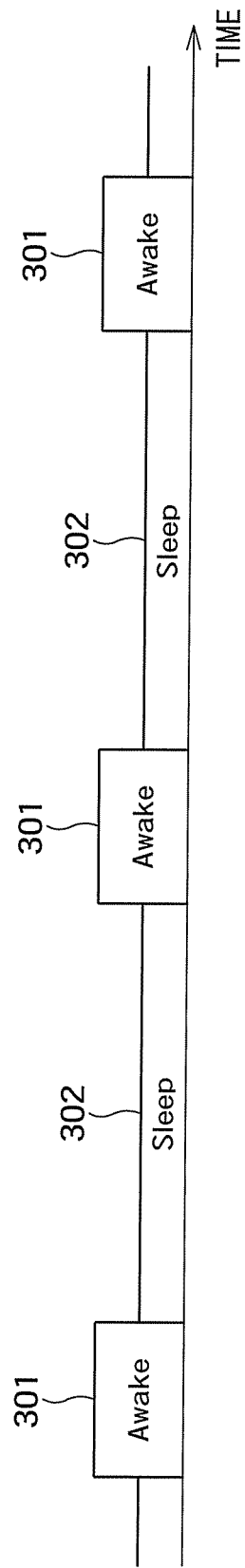
FIG. 3 is a view describing an intermittent receiving operation during standby of the terminal according to the present embodiment.

FIG. 3 is a view describing an intermittent receiving operation during standby of the terminal 100 according to the present embodiment. The horizontal axis in FIG. 3 indicates the time. While the terminal waits for a connection request frame from the other terminal, frame detection processing for detecting that the other terminal has transmitted a frame is required. The frame detection may be performed by, for example, measuring received power and detecting that the received power increases to a predetermined value or more. Alternatively, when a signal sequence of a frame to be transmitted is known, the frame detection may be performed by measuring the correlation between a reference signal representing the signal sequence and the received signal using a correlator and detecting that the correlation increases to the predetermined value or more.

Meanwhile, energizing a receiving circuit or performing correlation processing consumes power, and therefore a method is generally known which intermittently performs frame detection by providing a period for performing the frame detection and a period for not performing the frame detection. That is, the terminal 100 performs an intermittent receiving operation during standby.

In the period where the frame detection is not performed, the terminal 100 reduces wasteful power consumption by, for example, stopping a clock signal of a digital circuit or stopping power supplied to each unit. Herein, a period for performing the frame detection (a receiving operation period) 301 is referred to as an "awake period", and a stand-by period for not performing frame detection (a period other than the receiving operation period) 302 is referred to as a "sleep period". Generally, a timing to receive a connection request frame from the other terminal is an arbitrary timing, and therefore the awake period and the sleep period are switched by timing a period set in advance using a timer.

Figure 4:
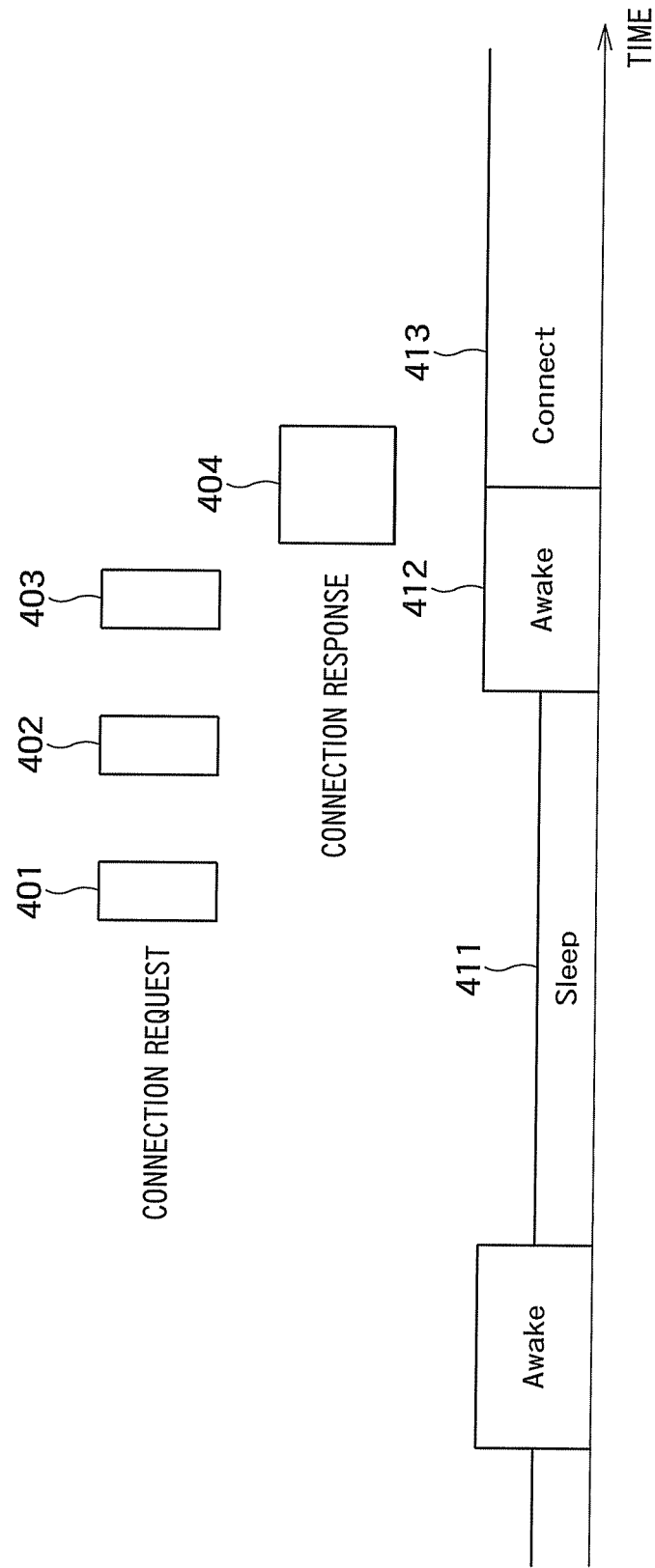
FIG. 4 is a view illustrating an operation example in a case where a connection request frame from the other terminal is detected during the intermittent receiving operation of the terminal according to the present embodiment.

FIG. 4 is a view illustrating an operation example in a case where a connection request frame from the other terminal is detected during the intermittent receiving operation of the terminal 100 according to the present embodiment. FIG. 4 illustrates an example where a connection request 401 reaches from the other terminal during a sleep period 411. Even when the other terminal approaches at a distance at which the terminal can receive the connection request 401, the terminal 100 is not performing a frame detecting operation in the sleep period 411, and therefore, does not notice the connection request 401. Similarly, it is not possible to perform a frame detection of the connection request 402 because of the sleep period 411. When there comes a connection request 403 which is received when an awake period 412 starts after the sleep period 411 ends, the terminal 100 learns for the first time that a frame transmitted from the other terminal has reached, and demodulates and decodes the frame. Then, when realizing that the frame is a connection request frame based on content of decoded data, the terminal 100 transmits a connection response frame 404 to the other terminal. By this means, the terminal 100 finishes the intermittent receiving operation during standby, and transitions to the connected state 413.

Hereinafter, an operation of a terminal according to Comparative Example will be described. Although the terminal according to Comparative Example also basically operates as described above with reference to FIGS. 2 to 4, the following problem occurs when demodulation and decoding of a connection request frame fail during the awake period.

Figure 5:
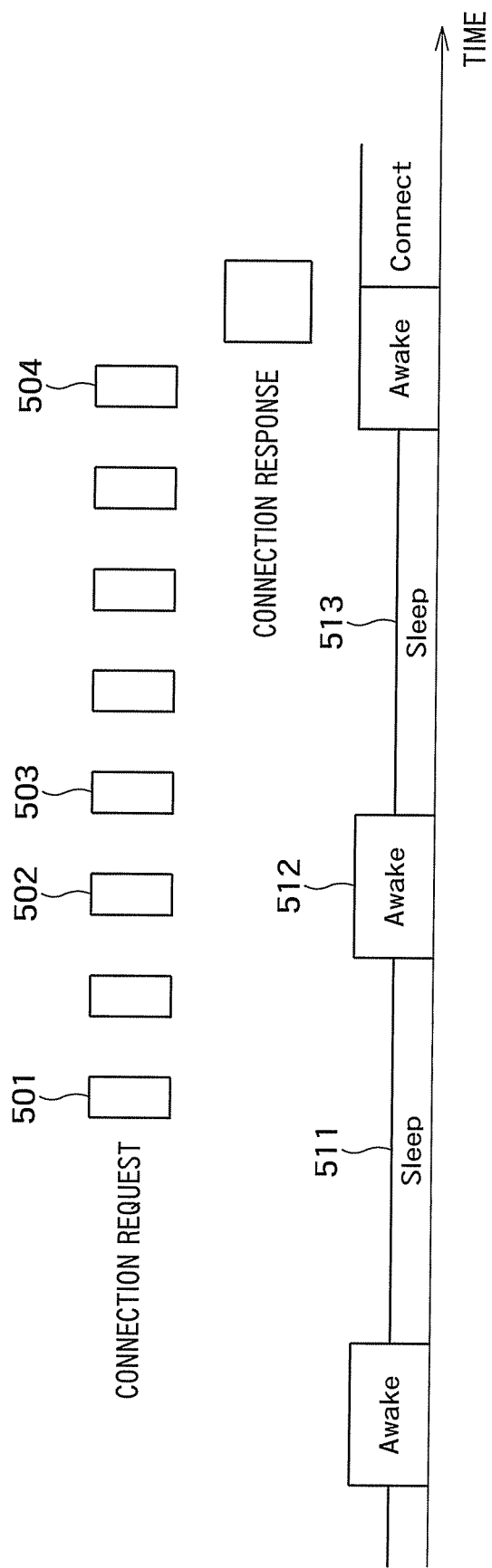
FIG. 5 is a view illustrating an operation example in a case where a connection request frame from the other terminal is detected during an intermittent receiving operation according to Comparative Example.

FIG. 5 is a view illustrating an operation example in a case where a connection request frame from the other terminal is detected during an intermittent receiving operation according to Comparative Example. With an example of FIG. 5, the connection request frame 501 from the other terminal arrives during the sleep period 511 similarly to the example in FIG. 4. Further, when there comes a connection request frame 502 to be received when the awake period 512 starts after the sleep period 511, arrival of a transmission frame from the other terminal is noticed for the first time.

However, a case will be assumed with this example where demodulation and decoding of the connection request frame 502 are tried but unsuccessful. The demodulation and decoding fail because the distance between terminals is long and received power of a received signal is weak, or there is interference from another wireless communication system.

In this case, with a general intermittent receiving operation according to Comparative Example, when an awake period 512 ends, the period transitions to the sleep period 513, and therefore, it is not possible to notice the next connection request frame 503 transmitted from the other terminal. Hence, a next occasion for receiving a connection request frame does not come until a timing to receive the connection request frame 504 comes. In this situation, it takes a time up to twice as long as the sleep period until a connection request frame is accurately received and the other terminal can be connected. Therefore, usability for users significantly decreases.

To reduce average power consumption during standby, it is necessary to make the awake period shorter and make the sleep period longer. However, when the sleep period is made too long, a long time is required to notice a connection request frame from the other terminal, and usability for users decreases. When the awake period is made too short, receiving, demodulating and decoding operations cannot be performed and the sleep operation starts if a signal from the other terminal includes an error. Hence, it is not possible to detect a signal from the other terminal until the next awake period, and therefore, a time required to accurately receive, demodulate and decode a signal from the other terminal becomes long and usability for users decreases. Therefore, it is necessary to keep a balance between the awake period and the sleep period.

To solve the above problem of Comparative Example, the terminal 100 according to the present embodiment operates as described below.

Figure 6:
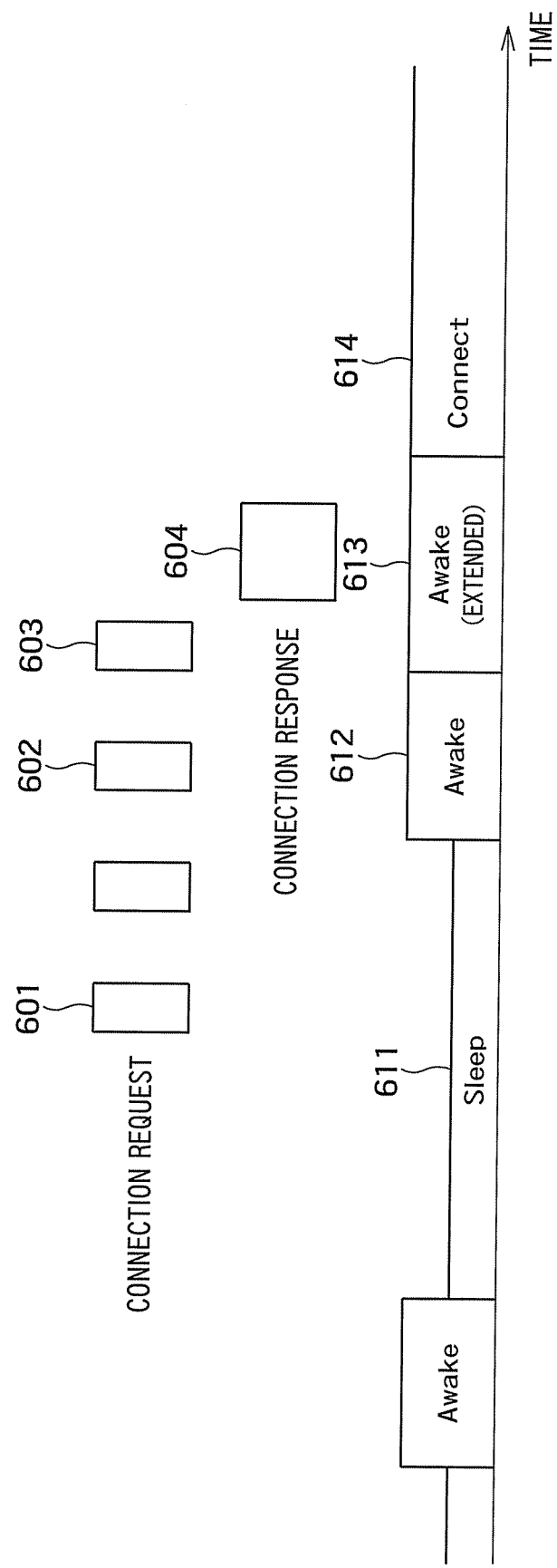
FIG. 6 is a view illustrating an operation example in a case where a connection request frame from the other terminal is detected during the intermittent receiving operation of the terminal according to the present embodiment.

FIG. 6 is a view illustrating an operation example in a case where a connection request frame from the other terminal is detected during the intermittent receiving operation of the terminal 100 according to the present embodiment. Similar to the example in FIG. 5, with an example in FIG. 6, it is assumed that a connection request frame 601 from the other terminal arrives during the sleep period 611, and received power of the connection request frame 602 detected during a subsequent awake period 612 is weak, and therefore, demodulation and decoding of the connection request frame 602 fail.

With the present embodiment, the terminal 100 has a mechanism of extending the awake period 612 being triggered by detection of a frame during the awake period 612. By this means, it is possible to detect a connection request frame 603 which is again transmitted next to the connection request frame 602 during the awake (extended) period 613 which is an extended period of the receiving operation.

When it is assumed with the present embodiment that the other terminal is currently approaching (the distance between the terminals becomes shorter), received power of the next connection request frame 603 is higher than that of the connection request frame 602, and detection, demodulation and decoding are more easily performed. When the connection request frame 603 are successfully demodulated and decoded and can be confirmed as a connection request frame, a connection response frame 604 is returned and the intermittent receiving operation ends to transitions to a connected state 614.

The sleep period 611 is longer than the awake period 612 which is a receiving operation period being not yet extended. For example, the sleep period is one second and the awake period 612 is 0.14 milliseconds.

The awake (extended) period 613 can be set to an arbitrary duration, and it may be shorter than the awake period 612. For example, the awake (extended) period 613 is 0.1 millisecond.

The awake (extended) period 613 is equal to or more than a cycle of the connection request frames 601, 602 and 603. For example, the cycle of the connection request frames 601, 602 and 603 is 0.1 millisecond.

The cycle of the receiving operation which is not yet extended is longer than the cycle of the connection request frames 601, 602 and 603. For example, the cycle of the receiving operation is 1.00014 seconds.

Figure 7:
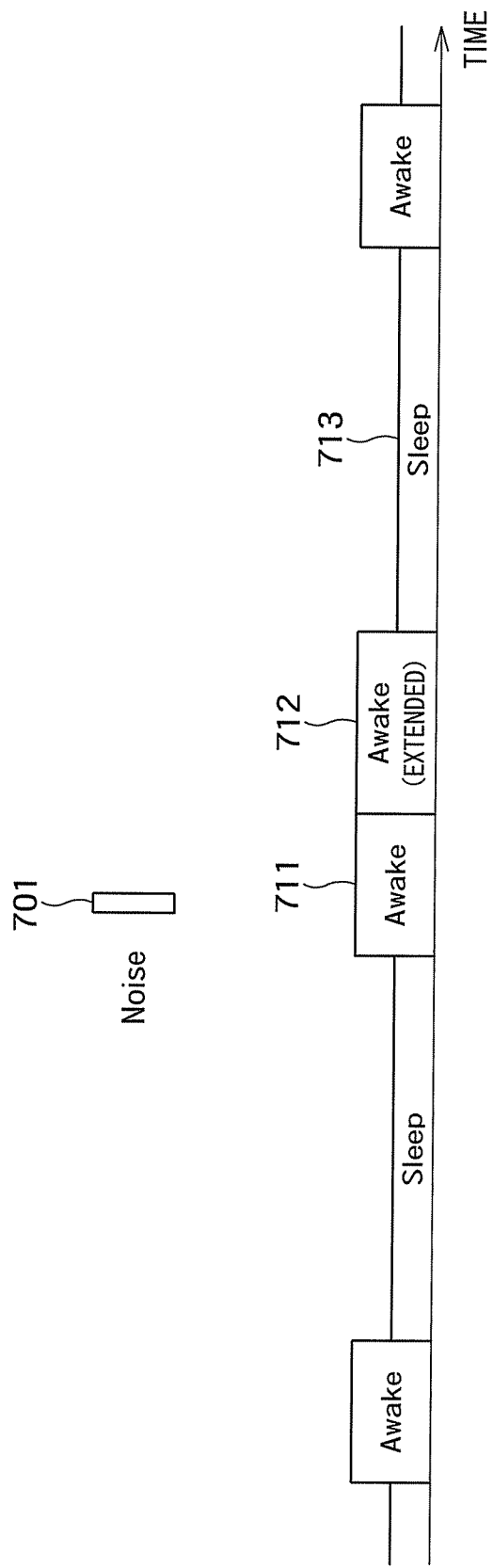
FIG. 7 is a view illustrating an operation example in a case where noise or interference from another system is detected as a frame by mistake during the intermittent receiving operation of the terminal according to the present embodiment.

FIG. 7 is a view illustrating an operation example in a case where noise or interference from another system is detected as a frame by mistake during the intermittent receiving operation of the terminal 100 according to the present embodiment. According to a configuration of detecting a frame using a correlation value with a known signal, there is a probability of erroneously detecting thermal noise as a frame by mistake (false alarm). Further, according to a configuration of detecting a frame using received power, when there is an interference from another communication system, received power increases and therefore there is a probability of erroneously detecting the increased power as a frame, by mistake, from the other terminal.

As illustrated in FIG. 7, even when noise 701 is erroneously detected as a frame during an awake period 711, the terminal 100 does not have means of determining whether or not the detection is erroneous. Therefore, if the awake period 711 ends, the awake period 711 is extended once. In the awake (extended) period 712, when no frame detection occurs again, it is determined that the frame detection is erroneous and the period transitions to the sleep period 713. When the probability of error detection is sufficiently low, it is possible to minimize an increase of average power consumption during standby resulting from the extension of the awake period produced by the operation.

Next, a configuration of the terminal 100 will be described.

Figure 8:
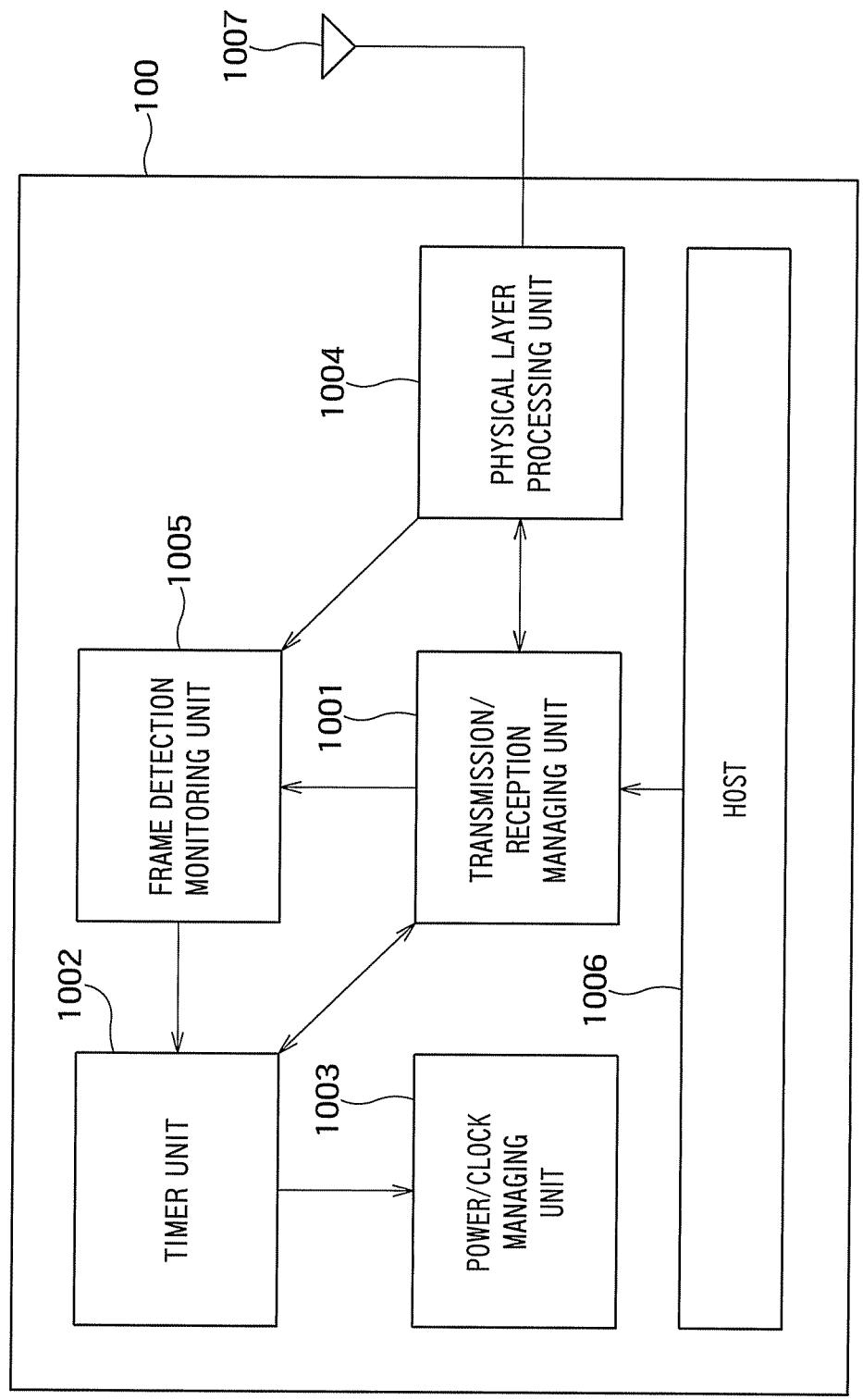
FIG. 8 is a block diagram illustrating a configuration of the terminal according to the present embodiment.

FIG. 8 is a block diagram illustrating a configuration of the terminal 100 according to the present embodiment. As illustrated in FIG. 8, the terminal 100 has a transmission/reception managing unit 1001, a timer unit 1002, a power/clock managing unit 1003, a physical layer processing unit 1004, a frame detection monitoring unit 1005 and a host 1006.

The transmission/reception managing unit 1001 controls the timer unit 1002, the frame detection monitoring unit 1005 and the physical layer processing unit 1004 based on an instruction from the host 1006, and manages transmission and reception. That is, the transmission/reception managing unit 1001 controls a timing of frame transmission and reception, and a communication state.

When, for example, the host 1006 issues an instruction to enter a standby state, the transmission/reception managing unit 1001 instructs the timer unit 1002 to measure times of an awake period and a sleep period, the physical layer processing unit 1004 to detect a frame, and the frame detection monitoring unit 1005 to monitor the frame detection.

Further, when the frame detected by the physical layer processing unit 1004 is a connection request frame, the transmission/reception managing unit 1001 causes the physical layer processing unit 1004 to transmit a connection response frame to respond to the connection request frame. If the host 1006 issues an instruction for entering a connected state, the transmission/reception managing unit 1001 trades data with the other terminal through the physical layer processing unit 1004.

The timer unit 1002 measures the times of the awake period and the sleep period in accordance with a trigger from the transmission/reception managing unit 1001, and, when a time-out occurs, notifies the time-out to the power/clock managing unit 1003.

Further, when receiving a notice of frame detection from the frame detection monitoring unit 1005, the timer unit 1002 extends the awake period which is the receiving operation period. Furthermore, when receiving a notice of frame detection from the frame detection monitoring unit 1005 again during the awake (extended) period which is the extended period of the receiving operation, the timer unit 1002 extends the awake period again.

Still further, when receiving no notice of frame detection from the frame detection monitoring unit 1005 during the awake (extended) period, the timer unit 1002 finishes the receiving operation and has the awake period proceed to the sleep period.

Being triggered by the timer unit 1002, the power/clock managing unit 1003 manages power of each unit related to wireless communication and generation of a clock.

More specifically, the power/clock managing unit 1003 supplies power and clocks to the frame detection monitoring unit 1005, the physical layer processing unit 1004 and the transmission/reception managing unit 1001 during the awake period and the awake (extended) period, that is, during the receiving operation period, based on control by the timer unit 1002. The frame detection monitoring unit 1005, the physical layer processing unit 1004 and the transmission/reception managing unit 1001 operate based on the clocks.

Meanwhile, the power/clock managing unit 1003 stops supplying the power and clocks to the frame detection monitoring unit 1005, the physical layer processing unit 1004 and the transmission/reception managing unit 1001 during the sleep period. By this means, a low power consumption mode in the sleep period is realized.

The physical layer processing unit 1004 is configured to perform close proximity wireless communication through the antenna 1007. More specifically, according to an instruction from the transmission/reception processing unit 1001, the physical layer processing unit 1004 encodes and modulates data and transmits the data, as a frame, through the antenna 1007; or receives a received signal through the antenna 1007, detects, demodulates and decodes the frame from the other terminal from the received signal and converts the received signal into data.

Further, when detecting the frame, the physical layer processing unit 1004 notifies the frame detection monitoring unit 1005 of the detection of the frame. The physical layer processing unit 1004 measures received power and determines that a frame is detected when the received power increases to a specific value or more, as described above. Alternatively, the physical layer processing unit 1004 may compute the correlation between the received signal and the reference signal set in advance as described above, and determine that a frame is detected when the correction increases to a specified value or more.

The frame detection monitoring unit 1005 monitors detection of a frame by the physical layer processing unit 1004 during the awake period and the awake (extended) period, that is, during the receiving operation. When a frame is detected, the frame detection monitoring unit 1005 notifies extension or another extension of the awake period to the timer unit 1002.

The host 1006 includes a user interface, and controls the terminal 100 by controlling the transmission/reception managing unit 1001.

Figure 9:
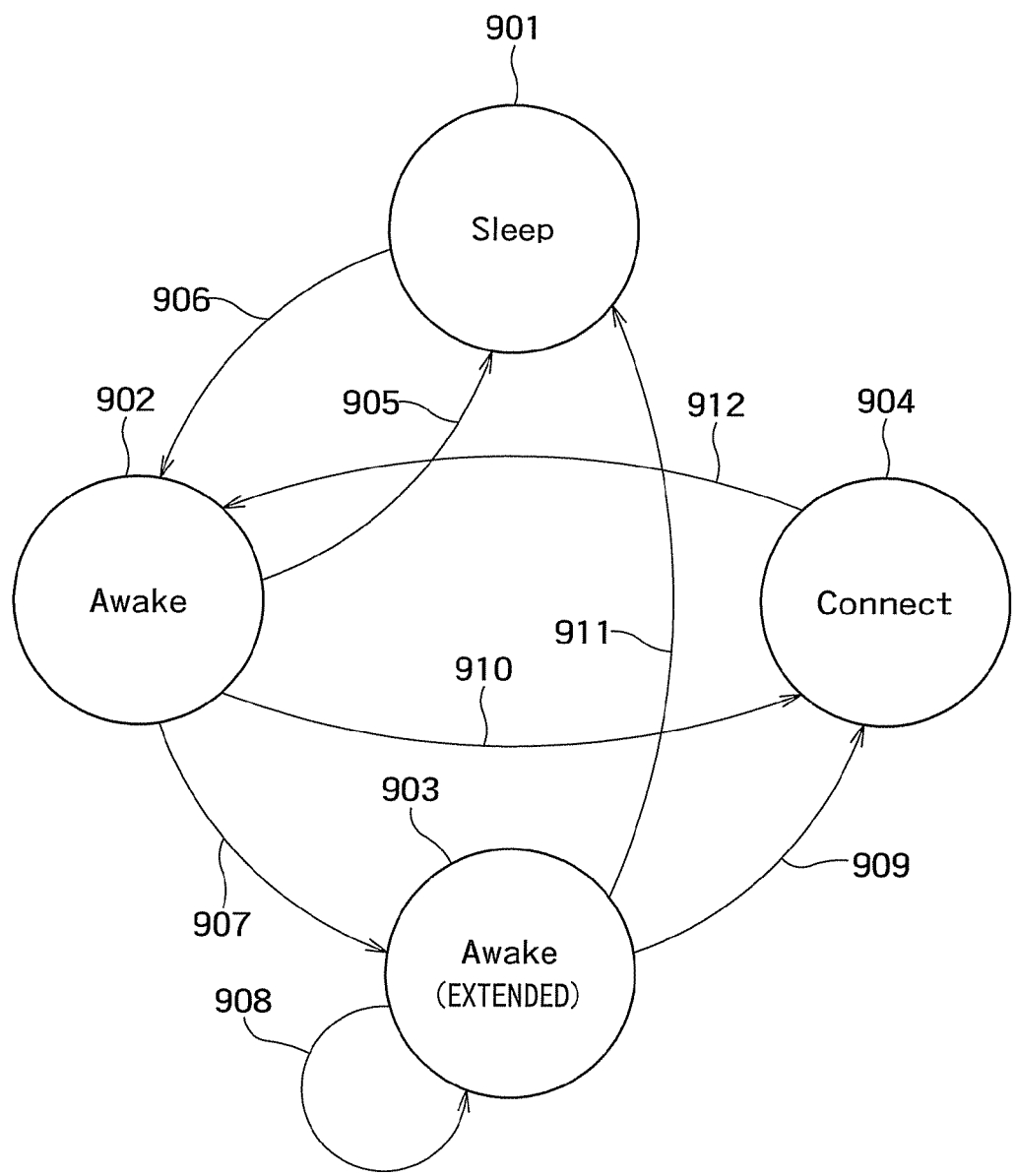
FIG. 9 is a state transition view related to power management of the terminal according to the present embodiment.

FIG. 9 is a state transition view related to power management of the terminal 100 according to the present embodiment. An initial state is an awake state 902. When an instruction of an intermittent receiving operation is given by the host 1006, the timer unit 1002 starts measuring an awake period, and the state transitions to a sleep state 901 when a time-out occurs (905). Meanwhile, the timer unit 1002 starts measuring the sleep period again and the state transitions to the awake state 902 when a time-out occurs. This transition is repeated during normal standby.

However, in the awake state 902, when frame detection is notified from the frame detection monitoring unit 1005 during the awake period, the state transitions to an awake (extended) state 903 (907). Even in the awake (extended) state 903, when the frame detection is notified again from the frame detection monitoring unit 1005 during the awake (extended) period, the awake period is further extended (908) to keep the awake (extended) state 903.

When connection response frames are returned and communication is established respectively in the awake state 902 and the awake (extended) state 903, the states transition to the connect state 904 (910 and 909) and the intermittent receiving operation is finished.

When frame detection is not performed respectively in the awake state 902 and the awake (extended) state 903, a time-out occurs and the states transition to the sleep state 901 (905 and 911). The transition is then repeated again between the sleep state 901 and the awake state 902. That is, the intermittent receiving operation is performed.

Further, when an instruction of finishing a communication connected state is given by the host 1006, the connect state 904 transitions to the awake state 902 (912) to wait for the instruction from the host 1006.

Figure 10:
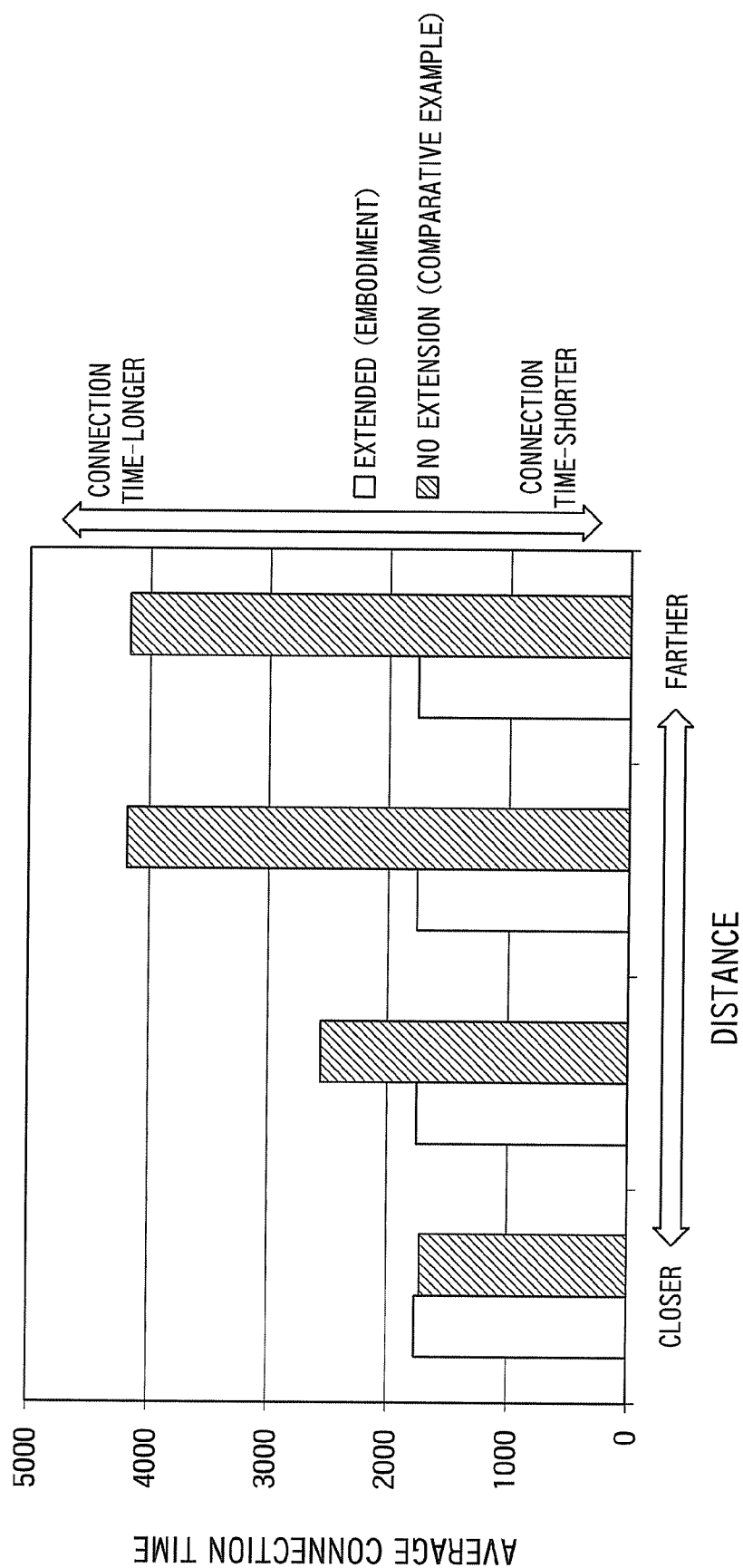
FIG. 10 is a view illustrating the relationship between a distance between terminals and an average connection time according to the present embodiment and Comparative Example.

FIG. 10 is a view illustrating the relationship between a distance between terminals and an average connection time according to the present embodiment and Comparative Example. The horizontal axis in FIG. 10 indicates the distance, and the vertical axis indicates a connection request retransmission count required to establish connection. When the retransmission count is higher, the time required to establish connection is longer. Comparative Example has been described with reference to FIG. 5. With the present embodiment, as illustrated in FIG. 10, the average connection time is virtually fixed irrespectively of the distance. However, with Comparative Example, when the distance is longer, the average connection time is longer. Thus, in environment in which the distance is longer, that is, in environment in which demodulation and decoding of a frame are likely to fail, it is possible to make a connection time shorter with the present embodiment compared to Comparative Example.

According to the present embodiment, when receiving a notice of frame detection from the frame detection monitoring unit 1005, the timer unit 1002 extends the awake period which is the receiving operation period. By this means, when a frame from the other terminal is not detected, it is possible to enter the sleep period as soon as the awake period ends. Meanwhile, when detection of a frame from the other terminal begins, it is possible to extend the awake period and, consequently, receive a next retransmission frame without entering the sleep period even if demodulation and decoding of a given frame fail. By this means, it is possible to reliably demodulate and decode a frame even if the awake period which is not yet extended is made shorter and, consequently, quickly and reliably establish connection while reducing power consumption of a standby operation.

Further, when receiving a notice of frame detection again during the awake (extended) period which is the extended period of the receiving operation, the timer unit 1002 extends the awake period again. By this means, it is possible to receive a next retransmission frame without entering a sleep period even under a situation where demodulation and decoding keep failing while frames can be detected. Consequently, it is possible to more quickly and reliably establish connection and improve usability of users.

Further, when receiving no notice of frame detection from the frame detection monitoring unit 1005 during the awake (extended) period which is the extended period of the receiving operation, the timer unit 1002 finishes the receiving operation. As a result, when frames are not continuously detected, it is possible to immediately return to the sleep period after determining that the error detection of frames occurs due to, for example, noise. Consequently, it is possible to reduce power consumption of a standby operation.

As described above, according to the present embodiment, it is possible to quickly establish connection while reducing power consumption of the standby operation. That is, it is possible to enable both of reduction in power consumption during standby and improvement in usability.

ANOTHER COMPARATIVE EXAMPLE

Hereinafter, another Comparative Example which the inventors comprehend will be described. There is a wireless communication device, for example, in which, upon completion of communication, the device stops a receiving operation only for a period set in advance and turning off a system to reduce power consumption during standby. The device restarts a receiving operation after a set period elapses, and waits for communication from the other terminal to start. Although this device can contribute to reducing power consumption, a set time determined in advance between a transmitting side and a receiving side is required, and is not suitable for an application which continuously performs communication or causes start of communication at random. The present embodiment does not involve such a problem.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A wireless communication device configured to perform an intermittent receiving operation during standby, comprising:
   a frame detection monitoring unit configured to monitor detection of a frame during a receiving operation in the intermittent receiving operation;
   a timer unit configured to extend a period of the receiving operation when receiving a notice of detection of the frame from the frame detection monitoring unit, and to extend the period of the receiving operation again when receiving again the notice of detection of the frame from the frame detection monitoring unit during an extended period of the receiving operation;
   a physical layer processing unit configured to receive a received signal and detect the frame from the received signal;
   a transmission/reception managing unit configured to control the timer unit, the frame detection monitoring unit and the physical layer processing unit, and to manage transmission and reception; and
   a power/clock managing unit configured to, based on control by the timer unit, supply power and a clock to the frame detection monitoring unit, the physical layer processing unit and the transmission/reception managing unit during the period of the receiving operation, and to stop supplying at least one of the power and the clock to the frame detection monitoring unit, the physical layer processing unit and the transmission/reception managing unit during a sleep period other than the period of the receiving operation in the intermittent receiving operation,
   wherein the frame detection monitoring unit monitors the detection of the frame by the physical layer processing unit; and
   wherein the frame detection monitoring unit, the physical layer processing unit and the transmission/reception managing unit operate based on the clock.

2. The wireless communication device according to claim 1, wherein the timer unit finishes the receiving operation when not receiving the notice of detection of the frame from the frame detection monitoring unit during the extended period of the receiving operation.

3. The wireless communication device according to claim 1, wherein the physical layer processing unit measures received power and determines that the frame is detected when the received power increases to a specified value or more.

4. The wireless communication device according to claim 1, wherein the physical layer processing unit computes a correlation between the received signal and a reference signal set in advance, and determines that the frame is detected when the correlation increases to a specified value or more.

5. The wireless communication device according to claim 1, wherein the sleep period is longer than the period of the receiving operation which is not yet extended.

6. The wireless communication device according to claim 1, wherein the extended period of the receiving operation is shorter than the period of the receiving operation which is not yet extended.

7. The wireless communication device according to claim 1, wherein the physical layer processing unit is configured to perform close proximity wireless communication.

8. The wireless communication device according to claim 7, wherein a communication standard of the close proximity wireless communication is TransferJet.

9. The wireless communication device according to claim 1, wherein when the detected frame is a connection request frame, the transmission/reception managing unit causes the physical layer processing unit to transmit a connection response frame responding to the connection request frame.

10. A wireless communication system comprising:
    a first wireless communication device according to claim 9; and
    a second wireless communication device configured to intermittently transmit the connection request frame as the frame, and to stop transmitting the connection request frame to proceed to a connected state in which the second wireless communication device can communicate with the first wireless communication device when receiving the connection response frame from the first wireless communication device.

11. The wireless communication system according to claim 10, wherein the extended period of the receiving operation is equal to or longer than a cycle of the connection request frame.

12. The wireless communication system according to claim 10, wherein a cycle of the receiving operation is longer than the cycle of the connection request frame.

13. The wireless communication system according to claim 10, wherein the first wireless communication device and the second wireless communication device are configured to perform close proximity wireless communication.

14. The wireless communication system according to claim 13, wherein a communication standard of the close proximity wireless communication is TransferJet.

* * * * *